United States Patent [19]
Friedrich et al.

[11] Patent Number: 5,716,077
[45] Date of Patent: Feb. 10, 1998

[54] FIRE RESISTANT SPRINKLER COUPLING

[75] Inventors: Ralph S. Friedrich, Hermosa Beach; Paul Kubat, La Mirada, both of Calif.

[73] Assignee: Ameron International Corporation, Pasadena, Calif.

[21] Appl. No.: 642,218

[22] Filed: May 6, 1996

[51] Int. Cl.⁶ ............................................. F16L 59/12
[52] U.S. Cl. ........................... 285/45; 285/47; 285/133.11
[58] Field of Search ........................... 285/45, 47, 53, 285/133.11, 133.21, 133.3, 133.4, 133.5, 189

[56] References Cited

U.S. PATENT DOCUMENTS

| | | | |
|---|---|---|---|
| 1,379,811 | 5/1921 | Fyffe | 285/133.11 |
| 2,937,662 | 5/1960 | Green | 285/133.11 |
| 3,645,564 | 2/1972 | Corriston | 285/133.21 |
| 4,112,967 | 9/1978 | Withem | 285/47 |
| 4,465,307 | 8/1984 | De Lange | 285/133.11 |
| 4,475,749 | 10/1984 | Pforr et al. | 285/133.11 |
| 4,676,532 | 6/1987 | Gronau et al. | 285/133.11 |
| 4,903,998 | 2/1990 | Stanley | 285/133.11 |

FOREIGN PATENT DOCUMENTS 8100775  4/1982  Netherlands .................. 285/47

*Primary Examiner*—Eric K. Nicholson
*Attorney, Agent, or Firm*—Christie, Parker & Hale, LLP

[57] ABSTRACT

A fire resistant sprinkler coupling for fire resistant composite pipe having a stainless steel pipe coupling having a first portion for attachment of a nozzle and a second portion adapted to receive a nipple. The nipple extends through a wall of the composite fire resistant pipe and into a stainless steel anchor sleeve for securing the pipe coupling to the composite fire pipe. An outer protective jacket is positioned on an outer surface of the composite fire steel sleeve and insulation pipe around the nipple and at least a portion of the pipe coupling. The outer protective jacket comprises a stainless steel sleeve and an insulation layer. Alternatively, the outer protective jacket includes a structural wall comprising layers of helically wound reenforcing fiber that is bonded together with a thermoset polymer resin selected from the group consisting of phenolic resins, siloxane-modified phenolic resins, furan resins, and mixtures thereof. At least one fire resistant layer is applied to the surface of the structural wall. The fire resistant layer includes a fibrous carrier component impregnated with a resin selected from the same group of resins used to form the structural wall. The fire resistant sprinkler coupling is mounted to the pipe wall to reduce the transfer of heat through the pipe wall during a fire.

21 Claims, 3 Drawing Sheets

FIRE RESISTANT SPRINKLER COUPLING

FIELD OF INVENTION

The present invention relates generally to a fire resistant sprinkler coupling for fire resistant pipe and, more particularly, to a sprinkler coupling that can be mounted to the pipe wall of a filament wound fiber-reinforced pipe having one or more surrounding fiber-reinforced resin impregnated layers, without transferring heat to the pipe wall during a fire.

BACKGROUND OF THE INVENTION

Pipes and pipe fittings formed from fiber-reinforced plastics have gained widespread acceptance as viable alternatives to their steel counterparts in such applications where cost, weight, and/or chemical resistance is a concern. Conventional fiber-reinforced plastic pipes include a filament component that is wound on a mandrel, and a resin component that is used to bond the filament windings together. The filament winding acts to structurally reinforce the otherwise resin pipe by providing a desired degree of hoop and longitudinal strength to the pipe. The fiber and resin components are selected for one or more desired physical properties, making the pipe particularly adapted to a specific application. Polyester and epoxy resins are typically favored for use in forming such pipes and pipe fittings because of their good weatherability, corrosion, and chemical resistance.

Fiber-reinforced plastic pipes and pipe fittings are used in applications where some degree of temperature resistance is desired as well as weather, corrosion and chemical resistance. An example of one such application is fire fighting piping that is used in industrial plants, offshore platforms and the like. Typically, pipes and pipe fittings used in fire fighting piping must be designed to accommodate and deliver a desired pressure of water, or other fire fighting liquid, foam, or foam/liquid mixture, when subjected to high temperature conditions or when placed in close flame vicinity. Fiber-reinforced plastic pipes are favored for use as fire fighting piping on off-shore oil platforms and are typically maintained in an empty or uncharged state until a fire is detected. Once a fire is detected, water is routed to the pipes at pressures that can be as high as 225 psig (16 Kgf/cm$^2$), depending on the rated pressure for the pipe. Accordingly, fiber-reinforced pipes that are used in such applications must be able to withstand an elevated temperature and/or close flame contact for a brief period of time when empty, i.e., without the benefit of being charged with water and having the water act as a heat transfer medium to minimize detrimental temperature effects.

A rigorous test has been devised to qualify fiber-reinforced pipes for use in such fire fighting pipe applications. The test requires placing the pipe and pipe fitting assembly in close vicinity to a 1,000° C. flame with the pipe dry for a period of five minutes, and then filling the pipe with water at a rated pressure for approximately twenty minutes. To pass the test, the pipe and pipe fittings assembly must show no more than minor leakage. Fiber-reinforced plastic pipes and pipe fittings formed from epoxy or epoxy resin have been shown to display significant temperature induced deterioration at temperatures as low as 120° C. and, therefore, have proven incapable of passing the test.

In response to the above-recognized problems and objectives, composite fire resistant pipes and pipe fittings have been developed by applicant having sufficient temperature and flame contact resistance to permit their use in such high-temperature applications as fire fighting piping. Such fire resistant pipes include a structural pipe wall formed from helically wound reinforcing fiber that is bonded together with a thermoset polymer resin. The polymer resin is selected from the group consisting of phenolic resins, siloxane-modified phenolic resins, furan resins, and mixtures thereof. The helically wound reinforcing fiber is wetted by the resin so that it comprises in the range of from about 10 to 40 percent by weight resin. The structural wall is formed from multiple layers of the windings, wherein the number of layers depend on such factors as the desired hoop and longitudinal strength, and temperature resistance desired for a particular pipe application.

In one embodiment, a fire resistant layer is applied to the surface of the structural pipe wall. The fire resistant layer is a resin rich layer that acts as a heat ablative shield. The fire resistant layer includes a carrier adapted to accommodate a large amount of a thermosetting polymer resin. The carrier is selected from the group of fibrous mat-like materials that include glass fiber, carbon fiber, nylon fiber, polyester fiber, similar fiber felts, chopped fibers, and combinations thereof. The resin component is selected from the same group of resins previously described for forming the structural pipe wall. It is desired that both resins be compatible, and preferably be the same, to facilitate forming a chemical bond between the structural pipe wall and the fire resistant layer during cure. The fire resistant layer comprises about three times the resin content of the helically wound reinforcing fiber layer.

In another embodiment, a number of energy absorbing material layers are disposed around a surface of the structural wall. The energy absorbing material used to form the layers is selected from the group of materials capable of absorbing heat energy from an outside surrounding layer by phase transformation, e.g., to produce a gas, below a degradation temperature of the structural wall. The gas formed by such phase transformation produces a thermally insulating air pocket between the structural wall and the surrounding outside layer.

The fire resistant layer in the first embodiment, and energy absorbing material layers in the second embodiment, are each formed having a sufficient wall thickness to protect the structural wall of the pipe or pipe fitting from heat induced degradation caused by exposing the outermost pipe wall to a 1,000° C. flame for at least five minutes when the pipe is in a dry condition, i.e., when the pipe is not charged with water.

In still another embodiment, a jacket comprising alternating layers of release material and fiber-reinforced resin are disposed around the structural pipe wall. The release material is chemically incompatible with the resin used to form both the structural pipe wall and fiber-reinforcing layers to function as an energy absorbing material that is capable of absorbing heat energy from an outside surrounding layer by phase transformation, e.g., to produce a gas, below a degradation temperature of the structural wall. The gas formed by such phase transformation produces a thermally insulating air pocket that acts to reduce thermal stress within the pipe.

Although fiber-reinforced plastic fire pipes have successfully been developed, a problem has arisen in the attachment of sprinkler nozzles to the pipe wall. The problem for composite pipe is the sprinkler nozzle represents a "fin" for transferring heat to the pipe wall before the composite pipe is charged with water which contributes to the destruction of the fire pipe during a fire and deters a good connection between the sprinkler nozzle and the fire pipe. Once the pipe is charged with water the nozzle is cooled by the water supply.

Consequently, a need exists for a fire resistant sprinkler coupling for composite fire pipe which prevents the transfer of heat to the fire pipe while the pipe is dry, is corrosion resistant, and provides a solid connection for the sprinkler nozzle at any position along the length of the fire pipe.

SUMMARY OF THE INVENTION

The present invention is a fire resistant sprinkler coupling for composite fire pipe which prevents the transmission of heat to the fire pipe wall thereby deterring the destruction of the pipe at the coupling connection. The coupling of the present invention is also corrosion resistant and is designed so that it is capable of being installed at any point along the length of the fire pipe.

The sprinkler coupling comprises a stainless steel pipe coupling threaded to a stainless steel nipple which extends through the fire pipe wall and is threaded into a stainless steel anchor sleeve. The anchor sleeve is axially positioned within the internal diameter of the fire pipe. An outer protective jacket extends around the nipple between the pipe coupling and the outside diameter of the fire pipe. A retaining nut is threaded on the pipe coupling above the protective jacket to firmly anchor the jacket to the fire pipe.

The combination of the outer protective jacket and the stainless steel components protect the composite pipe from the heat until water can be routed through the fire pipe to the sprinkler heads. The sprinkler coupling is designed to be installed in the field at the desired location for each particular application. The sprinkler coupling is easily installed by drilling a hole through the fire pipe wall for the nipple. The anchor sleeve is then slid inside the fire pipe to the location of the hole in the pipe wall. The nipple is threaded into the anchor sleeve and the pipe coupling is threaded onto the nipple. The outer protective jacket is placed around the lower portion of the pipe coupling and the nipple is mechanically secured to the outer diameter of the fire pipe by the retaining nut which is threaded onto the upper portion of the pipe coupling. A nozzle is threaded into the pipe coupling.

These improvements and other aspects of the invention will be more fully understood by referring to the following detailed description and the accompanying drawings.

DETAILED DESCRIPTION

Figure 1:
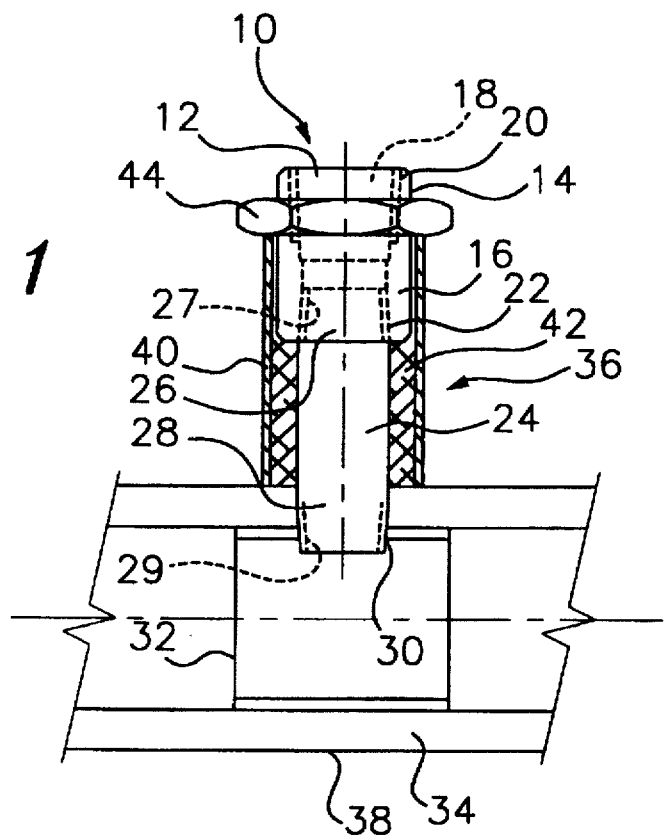
FIG. 1 is a cross-sectional front view of the fire resistant sprinkler coupling of the present invention.
Figure 2:
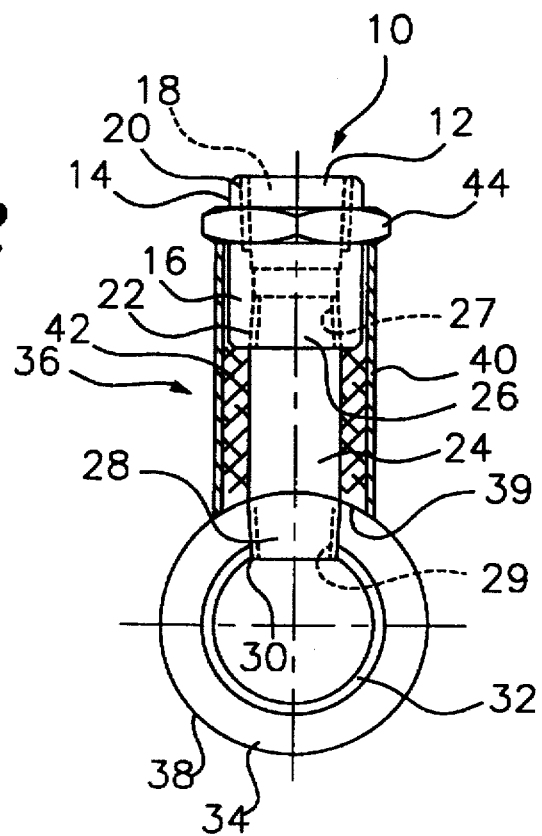
FIG. 2 is a cross-sectional side view of the coupling of FIG. 1.

Referring to FIGS. 1 and 2, a fire-resistant sprinkler coupling 10 is shown. The sprinkler coupling includes a stainless steel pipe coupling 12 having an upper portion 14 and a lower portion 16. The pipe coupling includes an axial bore 18 extending through the coupling wherein the bore includes a three-quarter national pipe thread (¾ NPT) 20 in the upper portion 14 for receipt of a nozzle (not shown), and a one-half inch national pipe thread (½ NPT) 22 located in the lower portion 16 for receipt of a stainless steel nipple 24. The threading located in the upper portion of the pipe coupling can include various size threading to accommodate different sized sprinkler nozzles, for example ½ NPT for a one-half inch nozzle.

The nipple 24 includes an upper portion 26 and a lower portion 28, each having a ½ NPT, 27 and 29 respectively, such that the upper portion is connected to the lower portion of the pipe coupling, and the lower portion 28 is connected to a threaded transverse bore 30 of a stainless steel anchor sleeve 32 positioned within the inside diameter of a nominal two-inch composite fire pipe 34. Preferably, the anchor sleeve has an outside diameter slightly smaller than the inside diameter of the fire resistant pipe so that it can readily slip along the length of the pipe before it is secured in place. For example, for standard nominal two-inch pipe, the sleeve has a two inch outer diameter to slip fit within the inner diameter of the composite pipe and has a 0.12 inch wall thickness. The stainless steel anchor sleeve provides a solid anchor which cannot fail during a fire.

An outer protective jacket 36 extends around the lower portion 16 of the pipe coupling and the nipple and has an end positioned against the outer surface 38 of the composite fire pipe 34. The outer protective jacket has a contoured lower surface 39 corresponding to the curvature of the outer surface 38 of the fire pipe. The outer protective jacket comprises a one-and-a-half inch outer diameter stainless steel tube 40 and a layer of mineral wool insulation 42 inside the stainless steel tube around the nipple 24.

Alternatively, the outer protective jacket 36 is a phenolic fiberglass composite sleeve. The specific details of the composition of the phenolic fiberglass construction for the outer protective jacket is discussed below in connection with the description of the composite fire pipe.

The outer protective jacket 36 is mechanically held against the outer surface 38 of the fire pipe by a tubing retaining nut 44. The retaining nut is threaded onto the outer diameter of the upper portion of the pipe coupling to hold the outer protective jacket against the fire pipe. The wall thickness for the outer protective jacket is preferably about ⅛ inch.

The fire resistant sprinkler coupling 10 of the present invention reduces the "fin" heat transfer effect to the composite pipe by requiring the heat to travel down the axis of the pipe coupling and nipple, or through the outer protective jacket instead of going directly to the inside wall of the composite fire pipe. Stainless steel is selected for the pipe coupling, nipple and anchor sleeve because stainless steel has a lower heat conductivity as compared to ordinary carbon steel. In addition, the components provide axial heat isolation from the composite fire pipe. Considering that many fire fighting systems use sea water to fight fires and are routinely tested on a monthly basis, the use of stainless steel components also inhibits corrosion problems inherent with carbon steel.

Figure 3:
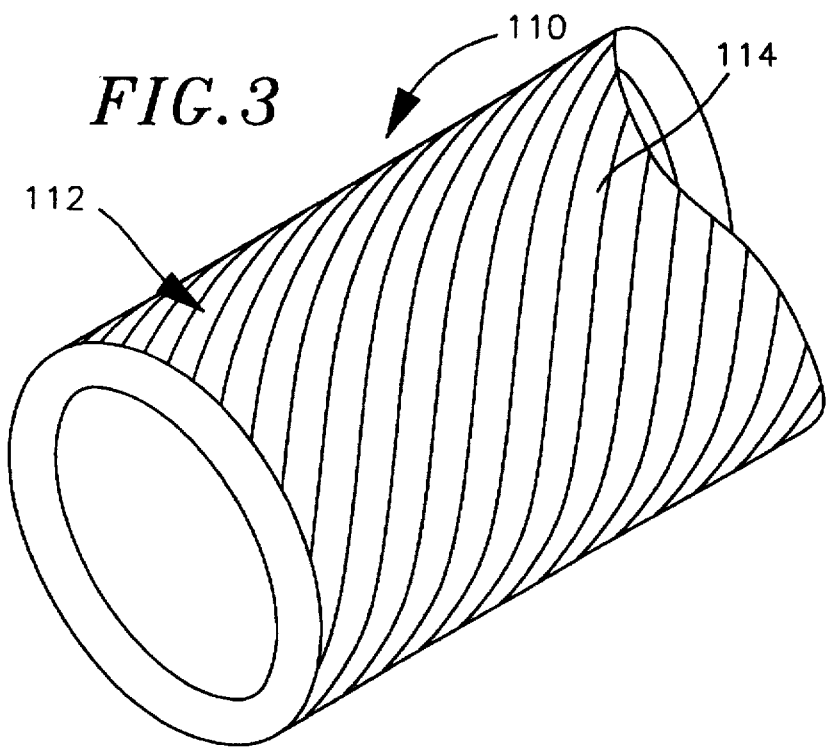
FIG. 3 is a perspective view of a first fire resistant pipe prior to application of one or more fire resistant layer(s)

Referring to FIG. 3, a typical composite fire resistant pipe 110, to which the sprinkler coupling is attached, includes a structural pipe wall 12 formed from multiple layers of helically wound reinforcing fiber 14 bonded together with a resin 116. Although the discussion herein refers to the composite pipe 110, it is to be understood that the construction and composition of the composite pipe is equally applicable to the construction and composition of the outer protective jacket 36 of the sprinkler coupling 10. The structural pipe wall 12 can be formed by using conventional techniques well known in the art for forming fiber-reinforced plastic (FRP) pipe, such as by winding the reinforcing fiber around a mandrel at one or more specific wind angles, and in one or more directions, to obtain a particular degree of hoop and longitudinal strength. In a preferred embodiment, the fiber windings are wound under tension at an angle of approximately ±54 degrees around the mandrel in one direction and then in an opposite direction, as this wind angle is known to produce a pipe having an optimum degree of both hoop and longitudinal strength. The number of fiber windings that are used to construct the structural pipe wall depends on the particular size of and application for the pipe.

The reinforcing fiber component may be selected from conventional filament materials used for forming FRP pipe that do not melt when exposed to fire such as glass, carbon, and the like, and combinations thereof. In a preferred embodiment, the reinforcing fiber is glass. The structural pipe wall is constructed so that a sufficient amount of the resin component is used to wet and bond together the fiber windings. The structural pipe wall may comprise in the range of from about 10 to 40 percent by weight of the resin component. In a preferred embodiment, the structural pipe wall comprises approximately 25 percent by weight resin. The resin is applied to the fiber windings by a conventional application technique, such as by running the windings through a resin bath.

The resin component may be selected from the group of resins consisting of phenolic resins, siloxane-modified phenolic resins, furan resins, and mixtures thereof. Any type of phenolic resin can be used as the resin component and is ultimately selected based on the desired physical properties for the intended end use application. Preferred phenolic resins suitable for use in forming the structural pipe wall include phenolic resole and phenolic novolac resins. Suitable phenolic resins can include those based on phenol, substituted phenols like para-cresol, xylenol, bisphenol A, paraphenylphenol, para-tert-butyl phenol, para-t-octyl phenol and resorcinol. The phenolic resin can be prepared by combining a suitable phenol with an aldehyde, such as formaldehyde, acetaldehyde, paraldehyde, glyoxal, hexamethylenetetraamine, and furfural.

Figure 4:
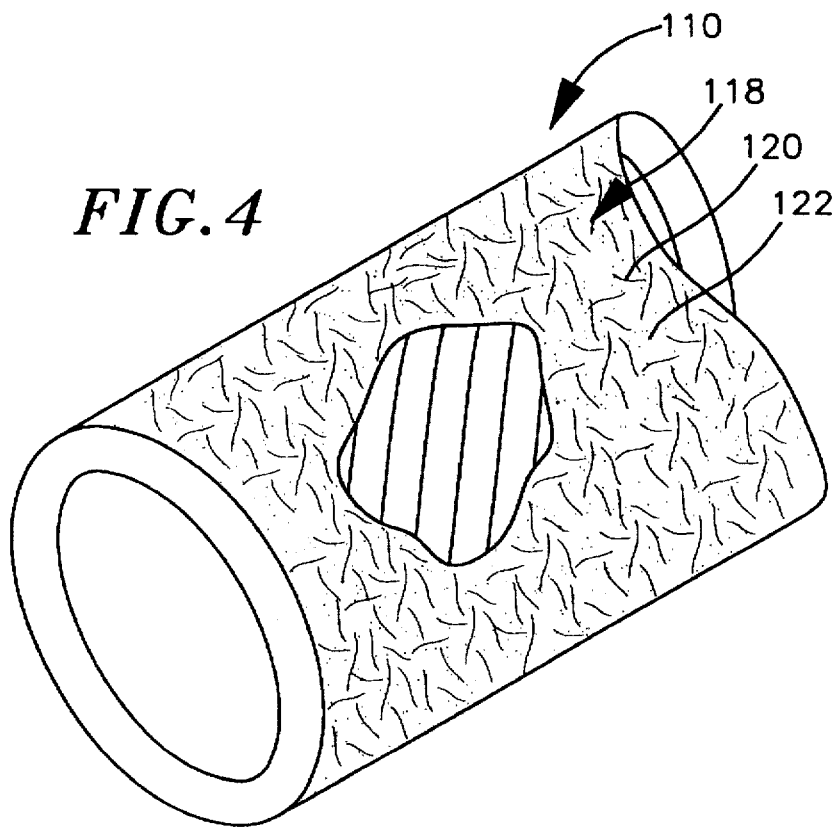
FIG. 4 is a perspective view of the fire resistant pipe of FIG. 3 after application of one or more fire resistant layer(s)

Referring now to FIG. 4, in a first embodiment, a fire resistant layer 118 is disposed around the outside surface of the structural pipe wall 112. The fire resistant layer 118 is generally a resin rich heat-ablative shield that is used to surround the structural pipe wall 112 and protect it from exposure to high temperature or direct flame contact. The fire resistant layer 118 comprises a carrier component 120 that is impregnated with a resin component 122. Typically, fire resistant layer 118 is wound circumferentially around the outside surface of the structural pipe wall 112 until a desired number of layers, i.e., heat shield wall thickness, is obtained. The fire resistant layer can, however, be applied by a spray application technique.

Figure 5:
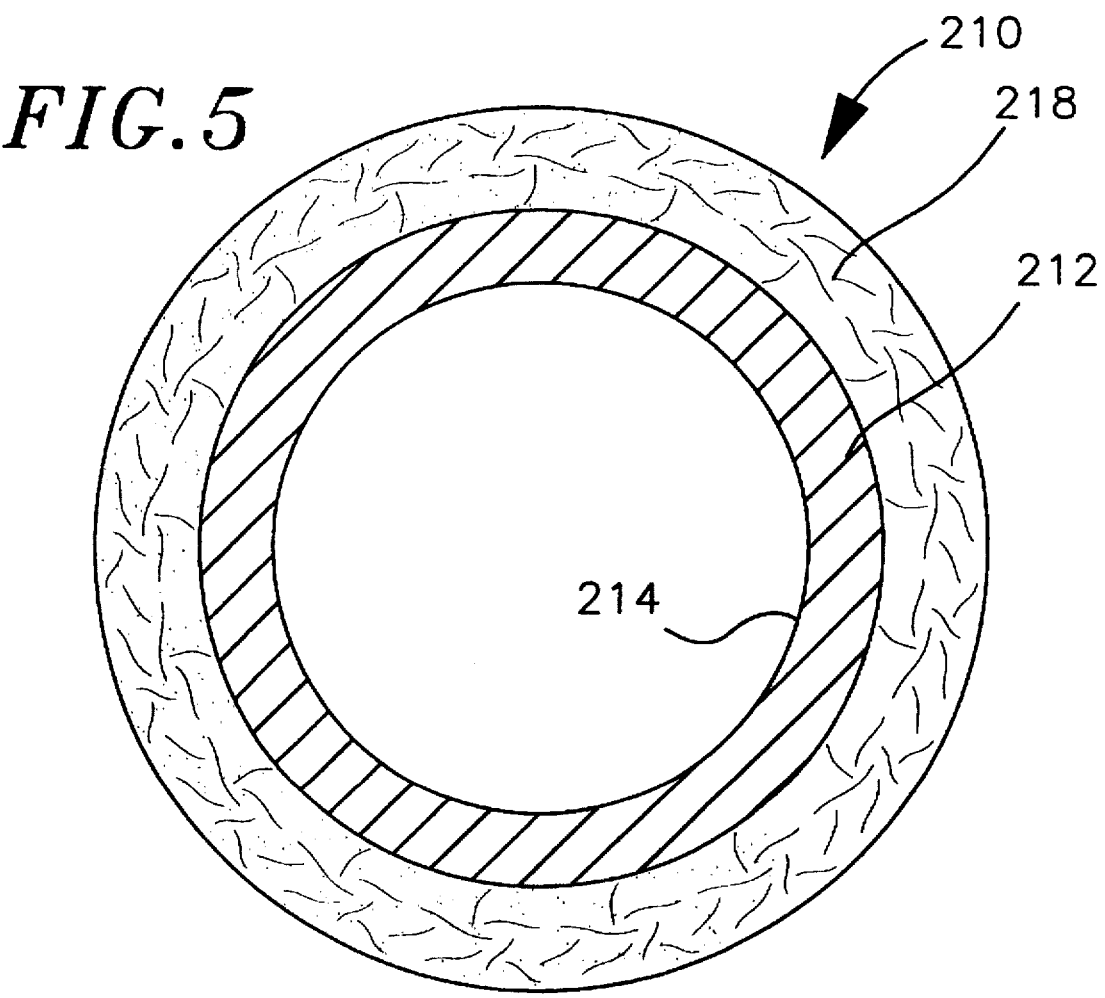
FIG. 5 is a cross-sectional view of the outer protective jacket of FIG. 1.

FIG. 5 illustrates the outer protective jacket 210 comprising a structural wall 212 formed from multiple fiber windings 214, and multiple fire resistant layers 218. The number of fire resistant layers that are used to form the outer protective jacket varies, depending on such factors as the size of the jacket, the potential temperature or flame exposure by the jacket, the type of fiber and/or resin component selected to form the structural jacket wall, the type of carrier and/or resin component selected to form the fire resistant layer, and the like.

The carrier component 120 used to form the fire resistant layer 118 for the pipe or the jacket can be formed from any type of material capable of both accommodating a large amount of the resin component and providing a support structure for the resin in both a wet and cured state. Additionally, it is desired that the carrier be capable of supporting the resin and not crumbling or flaking away from the structural pipe wall when subjected to high temperature or direct flame. It is desired that the carrier be capable of accommodating in the range of from 75 to 95 percent by weight of the resin component, or roughly three times the resin content of the fiber-reinforced windings. In a preferred first embodiment, the fire resistant layer comprises approximately 90 percent by weight resin.

Suitable carrier materials include fibrous mat-like structures comprising glass fiber, carbon fiber, mixtures of polyester fiber or nylon fibers with other high-temperature fibers, similar fiber felts, chopped fibers, and the like, and combinations thereof. A preferred glass fiber containing carrier material is one manufactured by Owens Corning of Toledo, Ohio under the product name C-Veil, product code number GC 70E, which is a thin mat of randomly oriented chopped C-glass fibers that are bound together by a binder dispersion. A preferred polyester fiber containing material is one manufactured by Precision Fabrics Group of Greensboro, N.C. under the product name Nexus, product code number 111-00005, which is formed from stretched and heat set 100 Dacron® polyester, and that does not contain any glass fibers.

Although the carrier component has been described and illustrated as being a mat-like structure applied by conventional winding technique, it is to be understood that the carrier can alternatively be in the form of a spray applicable material containing chopped fibers and resin. Suitable spray applicable carriers include those capable of being loaded with the above-described amount of the resin component for spray application onto the surface of the structural pipe wall using conventional spray application techniques.

The resin component 122 used to impregnate the carrier component to form the fire resistant layer 118 is selected from the same group of phenolic resins, siloxane-modified phenolic resins, furan resins, and mixtures thereof described above for the resin used to form the structural pipe wall. The resin component is applied to the carrier, when embodied as a mat-like structure, by the same technique described above for applying resin to the fiber-reinforced windings. It is preferred that the resin component selected for the fire resistant layer be the same as that selected to form the underlying structural pipe wall to ensure chemical compatibility and, thereby provide a good chemical bond between interfacing structural pipe wall and fire resistant layer surfaces during cure. Furthermore, by using the same resin, a single cure cycle is used for the entire pipe.

The sprinkler coupling 10 as shown in FIGS. 1 and 2 is designed for easy installation in the field at the desired location along the fire pipe for each particular application. The sprinkler coupling is installed by simply drilling a hole through the fire pipe wall for the nipple. The anchor sleeve is then slip fit within the inside of the fire pipe by being mounted on the end of a long pole using compressible foam or a pressure sensitive adhesive. The anchor sleeve is inserted inside the pipe using the pole to position the sleeve under the hole drilled in the pipe wall. The nipple is threaded into the bore in the sleeve to anchor the sleeve in place. The insertion pole is then removed from the inside of the pipe, leaving the anchored sleeve in place.

The pipe coupling is threaded onto the nipple and the outer protective jacket is placed around the lower portion of the pipe coupling and the nipple extending beyond the outer surface of the fire pipe. The outer protective jacket is mechanically held against the outer surface of the fire pipe by threading the tubing retaining nut onto the upper portion of the pipe coupling. A nozzle or sprinkler can be threaded into the pipe coupling to complete the installation. The mounting of couplings on the pipe can be done in the field. One or several holes are drilled through the pipe wall at desired locations and one or several sprinklers are mounted. The pipe can then be properly positioned in the fire protection system and secured in place, ready for use.

Although the present invention has been described and is illustrated with respect to a preferred embodiment, it is to be understood that the invention is not to be so limited, since changes and modifications may be made therein which are within the full intended scope of this invention as hereinafter claimed. Changes and variations include, for example, designs wherein the pipe coupling is integral with the nipple, the sprinkler can include female threads to go directly on the nipple and externally threaded for the tubing retaining nut, other dimensions for other pipe sizes or sprinkler sizes, and other sequences of assembly.

What is claimed is:

1. A fire resistant sprinkler coupling for attaching a nozzle to a fire resistant composite pipe comprising:
   a pipe coupling having a first portion adapted to receive a nozzle and a second portion adapted to receive a nipple;
   a nipple extending from the pipe coupling into an interior of the composite pipe;
   an anchor sleeve having a threaded transverse bore for receiving an end of the nipple for rigidly securing the nipple within the interior of the composite pipe; and
   an outer protective jacket positioned on an outer surface of the composite pipe around the nipple.

2. The sprinkler coupling of claim 1, wherein the pipe coupling, nipple and anchor sleeve are stainless steel.

3. The sprinkler coupling of claim 1, wherein the outer protective jacket comprises a stainless steel tube and an insulation layer between the tube and the nipple.

4. The sprinkler coupling of claim 1 further comprising a tubing retaining nut threaded onto the pipe coupling for mechanically securing the outer protective jacket to the outer surface of the composite pipe and adjusting the position of the nipple within the interior of the composite pipe.

5. The sprinkler coupling of claim 1, wherein the outer protective jacket includes a structural wall comprising layers of helically wound reinforcing fiber bonded with a resin selected from the group consisting of phenolic resins, siloxane-modified phenolic resins, furan resins, and mixtures thereof; and at least one fire resistant layer overlying the structural wall, wherein the fire resistant layer includes a fibrous carrier component impregnated with a resin selected from the group consisting of phenolic resins, siloxane-modified phenolic resins, furan resins, and mixtures thereof, and wherein the resin selected to form the fire resistant layer is compatible with the resin selected to form the structural wall.

6. The sprinkler coupling of claim 5 wherein the fiber component used to form the structural wall is selected from the group consisting of glass, carbon and combinations thereof.

7. The sprinkler coupling of claim 5 wherein the fibrous carrier component used to form the fire resistant layer is selected from the group consisting of glass containing matt, chopped glass containing matt, nylon containing matt, polyester containing matt, and combinations thereof.

8. The sprinkler coupling of claim 5 wherein the outer protective jacket comprises a number of energy-absorbing material layers interposed between the structural wall and the fire resistant layer.

9. The sprinkler coupling of claim 8 wherein the energy-absorbing material layer is formed from polyethylene.

10. The sprinkler coupling of claim 1 wherein the pipe coupling and the nipple are an integral component.

11. A sprinkler coupling comprising:
    means for attaching a nozzle to a composite fire resistant pipe;
    an anchor sleeve having a transverse threaded bore located within the fire pipe for receiving and rigidly connecting the nozzle attaching means to the composite fire resistant pipe; and
    an outer protective jacket mechanically secured to the composite fire resistant pipe around the nozzle attaching means.

12. The sprinkler coupling of claim 11 wherein the means for attaching the nozzle comprises a pipe coupling having a first end for attaching the nozzle, and a second end extending through a wall of the composite fire pipe for connection to the anchor sleeve.

13. The sprinkler coupling of claim 12 wherein the means for attaching the nozzle comprises a pipe coupling of low thermal conductivity material and a nipple attached to the pipe coupling.

14. The sprinkler coupling of claim 12 further comprising a tubing retaining nut threaded onto the pipe coupling for mechanically securing the outer protective jacket to an outer surface of the composite fire pipe.

15. The sprinkler coupling of claim 11 wherein the outer protective jacket includes a structural wall comprising layers of helically wound reinforcing fiber bonded with a resin selected from the group consisting of phenolic resins, siloxane-modified phenolic resins, furan resins, and mixtures thereof; and at least one fire resistant layer overlying the structural wall, wherein the fire resistant layer includes a fibrous carrier component impregnated with a resin selected from the group consisting of phenolic resins, siloxane-modified phenolic resins, furan resins, and mixtures thereof, and wherein the resins selected to form the fire resistant layer is compatible with the resins selected to form the structural wall.

16. The sprinkler coupling of claim 15 wherein the fiber component used to form the structural wall is selected from the group consisting of glass, carbon, and combinations thereof.

17. The sprinkler coupling of claim 15 wherein the fibrous carrier component used to form the fire resistant layer is selected from the group consisting of glass containing matt, chopped glass containing matt, nylon containing matt, polyester containing matt, and combinations thereof.

18. The sprinkler coupling of claim 15 comprising a number of energy-absorbing layers interposed between the structural wall and the fire resistant layer.

19. A sprinkler coupling of claim 18 wherein the energy-absorbing material layer is formed from polyethylene.

20. The sprinkler coupling of claim 11 wherein the outer protective jacket comprises a stainless steel tube and an insulation layer between the tube and the nozzle attaching means.

21. A fire resistant sprinkler coupling for attaching a nozzle to a fire resistant pipe comprising:
- a sleeve having a threaded bore loosely fitted inside a fire resistant pipe;
- a pipe nipple having one end extending through a hole through a wall of the pipe and rigidly secured into the bore of the sleeve;
- means for connecting a nozzle to the other end of the pipe nipple;
- a thermally protective jacket around the nipple; and
- means for clamping the protective jacket against the outside wall of the pipe.

* * * * *